United States Patent [19]

Topper

[11] Patent Number: 5,227,027
[45] Date of Patent: Jul. 13, 1993

[54] HIGH EFFICIENCY WATER DISTILLATION APPARATUS USING A HEAT PUMP SYSTEM AND PROCESS FOR USE THEREOF

[76] Inventor: Robert T. Topper, 103 Buckingham Ave., Trenton, N.J. 08618

[21] Appl. No.: 788,969

[22] Filed: Nov. 7, 1991

Related U.S. Application Data

[63] Continuation-in-part of Ser. No. 571,067, Aug. 23, 1990, abandoned.

[51] Int. Cl.$^5$ .......................... B01D 3/00; C02F 1/04
[52] U.S. Cl. ........................................ 203/10; 55/185; 62/238.5; 62/238.7; 62/324.1; 202/177; 202/197; 203/23; 203/24; 203/27; 203/40; 203/91; 203/DIG. 4; 203/DIG. 8
[58] Field of Search ...................... 203/10, 23, DIG. 4, 203/91, 40, 24, 27, DIG. 8; 202/197, 177, 176; 55/185; 62/238.5, 238.7, 324.1

[56] References Cited

U.S. PATENT DOCUMENTS

| | | | |
|---|---|---|---|
| 2,619,453 | 11/1952 | Andersen | 202/177 |
| 2,921,004 | 1/1960 | Wood | 202/177 |
| 3,203,875 | 8/1965 | Sturtevant | 202/173 |
| 3,226,306 | 12/1965 | Hausner | 202/177 |
| 3,234,109 | 2/1966 | Lustenader | 203/11 |
| 3,299,649 | 1/1967 | McGrath et al. | 62/79 |
| 3,404,537 | 10/1968 | Leonard, Jr. | 62/123 |
| 3,461,041 | 8/1969 | Snyder | 137/246.22 |
| 3,461,460 | 8/1969 | McGrath | 203/11 |
| 3,486,985 | 12/1969 | McGrath | 202/173 |
| 3,492,205 | 1/1970 | Webber | 203/26 |
| 3,522,149 | 7/1970 | Arvan | 202/196 |
| 3,860,492 | 1/1975 | Lowi, Jr. et al. | 202/236 |
| 4,003,798 | 1/1977 | McCord | 203/DIG. 4 |
| 4,014,751 | 3/1977 | McCord | 202/160 |
| 4,181,577 | 1/1980 | Foley | 202/181 |
| 4,214,454 | 7/1980 | Taylor | 203/DIG. 4 |
| 4,248,056 | 2/1981 | Beacham | 62/238.7 |
| 4,267,022 | 5/1981 | Pitcher | 203/DIG. 4 |
| 4,278,502 | 7/1981 | Stevens et al. | 202/206 |
| 4,345,971 | 8/1982 | Watson | 203/DIG. 4 |
| 4,390,396 | 6/1983 | Koblenzer | 202/166 |
| 4,463,575 | 8/1984 | McCord | 62/184 |
| 4,537,660 | 8/1985 | McCord | 203/DIG. 4 |
| 4,585,524 | 4/1986 | Hoiss | 203/DIG. 4 |
| 4,678,587 | 7/1987 | Veinche et al. | 203/10 |
| 4,770,748 | 9/1988 | Cellin et al. | 202/185.1 |
| 4,955,207 | 9/1990 | Mink | 165/104.21 |
| 5,108,548 | 4/1992 | Keene et al. | 203/DIG. 4 |

Primary Examiner—Virginia Manoharan
Attorney, Agent, or Firm—Sperry, Zoda & Kane

[57] ABSTRACT

A water distillation system and process capable of high efficiency operation used in combination with a heat pump system wherein the water distillation apparatus includes a water pre-heating device positioned within the feed water to heat the feed water to approximately 150 degrees Fahrenheit to facilitate operation of a water evaporator device which vaporizes the water by boiling thereof. Contaminants are removed from this pure water vapor which is at approximately 215 degrees Fahrenheit. The water vapor is passed to a water condenser to provide high purity water at approximately 180 degrees Fahrenheit. The heat pump system provides for refrigerant condensing at approximately 225 degrees Fahrenheit to facilitate boiling of the water in the adjacent water evaporator and includes refrigerant vaporization adjacent the water condenser to facilitate absorbing and reclaiming of the latent heat of the distillate.

24 Claims, 1 Drawing Sheet

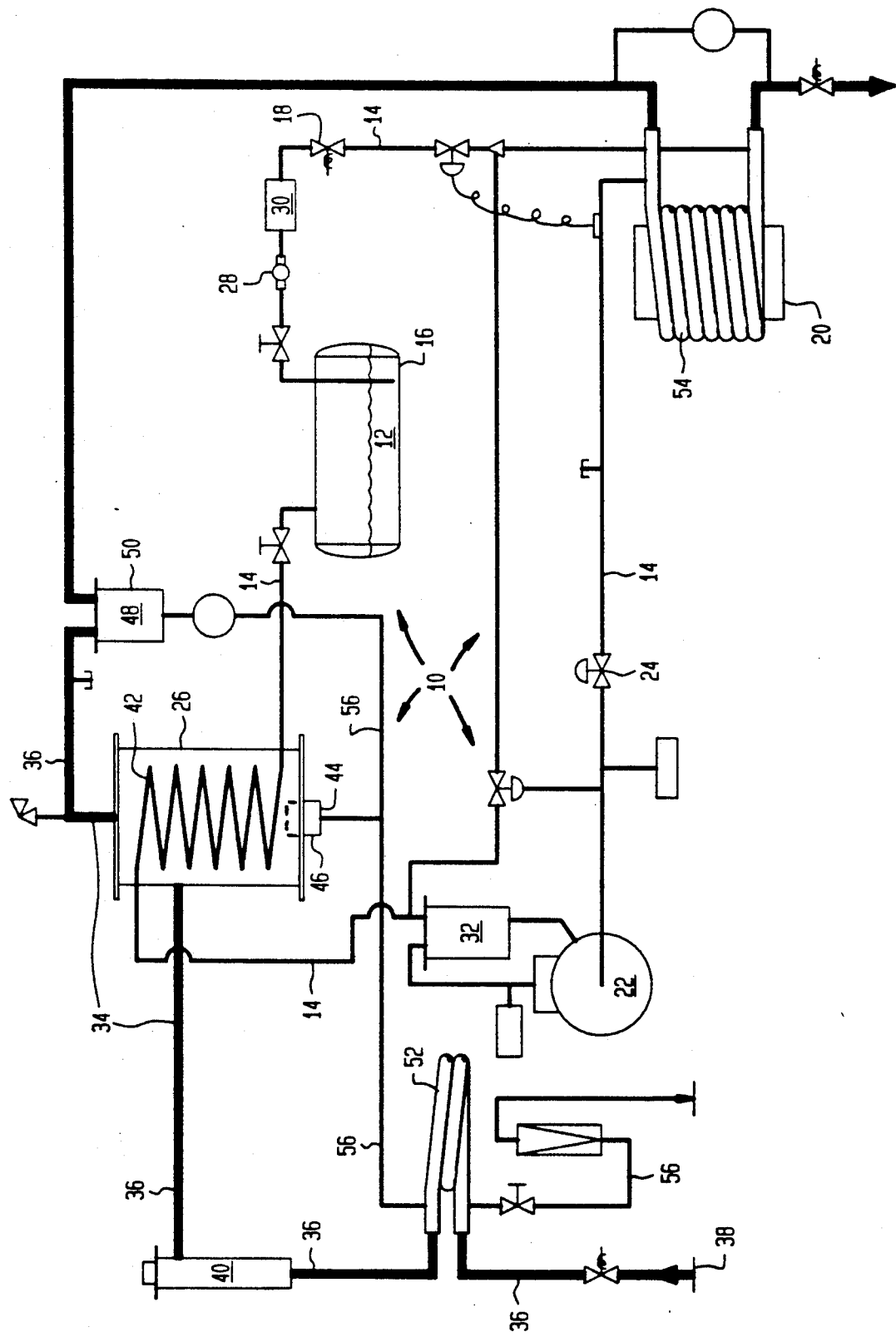

HIGH EFFICIENCY WATER DISTILLATION APPARATUS USING A HEAT PUMP SYSTEM AND PROCESS FOR USE THEREOF

This application is a continuation-in-part of U.S. patent application Ser. No. 07/571,067, filed Aug. 23, 1990, now abandoned.

BACKGROUND OF THE INVENTION

1. Field Of The Invention

Pure water is most commonly produced by distillation which is the oldest and well-known method. In practice, there are currently three different types of distillation systems, namely, standard thermal, multiple effect and vapor compression. All of these types purify by vaporizing a portion of the feed water thereby concentrating impurities in the remaining liquid and subsequently condensing the pure distillate. Often the vapor phase is further purified by filtration or baffling devices that eliminate particles, such as pyrogens, that may be carried over during the vaporization. To maintain the high level of purity, piping and components that are wetted by the vapor or condensate are fabricated from stainless steel or similar non-corrosive materials.

The thermal still is the simplest form. Feed water is passed through a heat exchanger that may be heated by steam or electrical resistance elements. It is brought to boiling and the vapor is then condensed in a second heat exchanger that is usually water cooled. While this is a very simple process there is an inherent and significant lack of efficiency.

Multiple effect stills provide multi-stage variations of the standard still that operate with greater efficiency. For example high pressure steam is used to vaporize feed water in the first stage of such a still. Vapor generated in the first stage is then condensed in a second heat exchanger. Heat released in this phase change is used to vaporize additional feed water. Theoretically given sufficient high steam supply pressure, any number of stages can be so arranged, each producing the same amount of distillate from essentially the same single quantity of latent heat. In practice typical designs incorporate four or five stages. While efficient, multiple effect stills are expensive and require pressure vessels and a reliable supply of high pressure steam.

The vapor compression still utilizes a mechanical compressor to increase the heat energy of the pure water vapor so that the latent heat of condensation can be transferred to the vaporizing feed water through a heat exchanger. Because this latent heat vaporization is recovered, this is a highly efficient system. Further high pressure equipment is not required. On the other hand the mechanical compressor which is most usually constructed from stainless steel is rather expensive and is subject to maintenance problems and contamination problems.

The present invention offers a high level of energy efficiency and yet does not require high pressures, special seals or a mechanical compressor for water vapor compression. The present system incorporates a very high temperature refrigeration circuit to transfer heat release during condensation of the distillate to the feed water.

2. Description Of The Prior Art

Various prior art devices have been utilized to provide high efficiency distillation systems, some utilizing refrigeration or heat pumping systems coordinated therewith such as U.S. Pat. No. 2,619,453 issued Nov. 25, 1952 to R. Andersen on a Vapor-Compression Distillation; U.S. Pat. No. 2,921,004 issued Jan. 12, 1960 to L. Wood on an Apparatus For The Evaporation Or Distillation Of Water; U.S. Pat. No. 3,203,875 issued to H. Sturtevant on Aug. 31, 1965 for an Apparatus For Distilling Water With Waste Heat; U.S. Pat. No. 3,226,306 issued to J. Hausner on Dec. 28, 1965 for a Rotary Film Distillation And Gas Refrigerant Condensing Apparatus; U.S. Pat. No. 3,234,109 issued to E. Lustenader on Feb. 8, 1966 on a Method And Apparatus For Flash Distillation; U.S. Pat. No. 3,299,649 issued to W. McGrath et al on Jan. 24, 1967 for Separation Systems; U.S. Pat. No. 3,404,537 issued to J. Leonard, Jr. on Oct. 8, 1968 for a Combined Refrigeration And Saline Water Conversion System; U.S. Pat. No. 3,461,041 issued to T. Snyder on Aug. 12, 1969 for Vapor Compression Distillation Of Chemically Treated Degassed Saline Water; U.S. Pat. No. 3,461,460 issued to W. McGrath on Aug. 12, 1969 for Flash Distillation With Condensed Refrigerant As Heat Exchanger; U.S. Pat. No. 3,486,985 issued to W. McGrath on Dec. 30, 1969 for Flash Distillation Apparatus With Refrigerant Heat Exchange Circuits; U.S. Pat. No. 3,492,205 issued t. R. Webber on Jan. 27, 1970 for a Distillation System And Method; U.S. Pat. No. 3,522,149 issued to J. Arvan on Jul. 28, 1970 for a Distillation Apparatus To Recover Potable Water From Non-Potable Water; U.S. Pat. No. 4,014,751 issued to J. McCord on Mar. 29, 1977 for a Vapor Generating And Recovering Apparatus; U.S. Pat. No. 4,181,577 issued to N. Foley on Jan. 1, 1980 for a Refrigeration Type Water Desalinization Units; U.S. Pat. No. 4,214,454 issued Jul. 29, 1980 to J. Taylor on a Water Recovery System; U.S. Pat. No. 4,248,056 issued Feb. 3, 1981 to W. Beacham on a Heat Reclaimer For A Heat Pump; U.S. Pat. No. 4,267,022 issued May 12, 1981 to F. Pitcher on an Energy Efficient Process And Apparatus For Desalinizing Water; U.S. Pat. No. 4,278,502 issued to C. Stevens et al on Jul. 14, 1981 for a Chemical Recovery Apparatus; U.S. Pat. No. 4,345,971 issued Aug. 24, 1982 to W. Watson on a Distillation Employing Heat Pump; U.S. Pat. No. 4,390,396 issued to H. Koblenzer on Jun 28, 1983 for an Apparatus For The Distillation of Vaporizable Liquids; U.S. Pat. No. 4,463,575 issued to J. McCord on Aug. 7, 1984 for Vapor Generating And Recovery Apparatus Including A Refrigerant System With Refrigerant Heat Removal Means; U.S. Pat. No. 4,678,587 issued Jul. 7, 1987 to J. Voinche et al on a Water Distillation Method; U.S. Pat. No. 4,770,748 issued to J. Cellini et al on Sep. 13, 1988 for a Vacuum Distillation System and U.S. Pat. No. 4,955,207 issued Sep. 11, 1990 to C. Mink on a Combination Hot Water Heater-Refrigeration Assembly.

SUMMARY OF THE INVENTION

The present invention provides a high efficiency water distillation process and apparatus including a heat pump process and system wherein the heat pump apparatus includes refrigerant passing through a refrigerant conduit. A liquid receiver is defined for accumulating the refrigerant therein in liquid form.

The heat pumping system further includes an expansion valve operatively connected with respect to the refrigerant conduit for receiving refrigerant from the liquid receiver. A refrigerant evaporator is operatively connected with respect to the refrigerant conduit for receiving refrigerant from the expansion valve. A compressor is operatively connected with respect to the refrigerant conduit for compressing the refrigerant vapor received from the refrigerant evaporator. An evaporator pressure regulator may be included positioned within the refrigerant conduit between the refrigerant evaporating device and the compressor to restrict the evaporation of the refrigerant such that it occurs at approximately 180 degrees Fahrenheit.

A refrigerant condensing device is adapted to receive the compressed refrigerant vapor from the compressor for condensing thereof into liquid phase at approximately 225 degrees Fahrenheit to facilitate accumulation of refrigerant within the liquid receiver. A sight glass may be positioned within the refrigerant conduit between the liquid receiver and the expansion valve to facilitate external viewing of operation of the system. Furthermore a filter dryer may be positioned within the refrigerant conduit between the liquid receiver and the expansion valve for processing of refrigerant passing therethrough. Additionally an oil separator may be positioned within the refrigerant conduit as required.

The water distillation device for use with the heat pumping apparatus may preferably include a feed water supply line defining an inlet therein adapted to receive feed water at approximately 70 degrees Fahrenheit. The water pre-heating device may be positioned within the feed water supply line or the water evaporator and is adapted to heat the feed water passing therethrough to a approximately 150 degrees Fahrenheit. A water evaporator is adapted to receive water through the feed water supply line from the water pre-heating means. The water evaporator is operative at a level of at least one atmospheric barometric pressure and is operatively positioned in thermal communication with respect to the refrigerant condenser to receive heat therefrom for vaporization of the feed water after pre-heating thereof and while passing through the water evaporator. The water evaporator heats the water to at least its saturation temperature, nominally 212 degrees Fahrenheit, to achieve the vaporization thereof by actual boiling.

The primary contaminant removal device is positioned adjacent the water evaporator and is adapted to remove contaminants accumulated by the evaporator and impurities accumulated by the evaporator for removal. Preferably the primary contaminant removal means comprises a blow down removal means. A secondary contaminant removal means is adapted to receive the vaporized feed water from the water evaporator for removal of contaminants. This secondary contaminant removal means preferably comprises a baffle device providing a plurality of surfaces which induce directional and velocity changes over which the water vapor therein passes to remove particulate contaminants and minute water droplets therefrom. This secondary contaminant removal means is adapted to supply purified water vapor to the water condensing device.

A heat reclaiming device may be positioned within the feed water supply line between the inlet end thereof and the water pre-heating device. The heat reclaiming device is in thermal communication with respect to the primary and secondary contaminant removal means to recycle heat from the materials removed by these two contaminant removal means to the incoming feed water. In this manner reclaiming of this heat will provide significant economizing measures and minimize the amount of heating and thus energy required by the pre-heater.

A water condenser is adapted to receive the vaporized and purified water from the contaminant removal device. The water condenser is operatively positioned in thermal communication with respect to the refrigerant evaporator to be cooled therefrom to facilitate condensation of vaporized feed water within the water condenser means at approximately 180 degrees Fahrenheit. A water exit line is in fluid flow communication with respect to the water condenser to receive the high quality distilled water therefrom for usages thereof as desired.

It is an object of the present invention to provide an improved highly efficient water distillation process and apparatus for use with a heat pump system wherein hot water distillate of such high quality is produced as to be usable within the pharmaceutical industry.

It is an object of the present invention to provide an improved highly efficient water distillation process and apparatus for use with a heat pump system wherein vaporization of water within the water evaporator is achieved by boiling above atmospheric pressure.

It is an object of the present invention to provide an improved highly efficient water distillation process and apparatus for use with a heat pump system wherein a pre-heater is included to help raise the operating temperature of the system in order to facilitate vaporization within the water evaporator by boiling above atmospheric pressure.

It is an object of the present invention to provide an improved highly efficient water distillation process and apparatus for use with a heat pump system wherein heat is reclaimed from contaminant and condensate droplet removal.

It is an object of the present invention to provide an improved highly efficient water distillation process and apparatus for use with a heat pump system wherein the latent heat of the distillate is reclaimed by the evaporating refrigerant.

It is an object of the present invention to provide an improved highly efficient water distillation process and apparatus for use with a heat pump system wherein water vapor is condensed at approximately 180 degrees Fahrenheit.

It is an object of the present invention to provide an improved highly efficient water distillation process and apparatus for use with a heat pump system wherein the water evaporator produces pure water vapor at approximately 215 degrees Fahrenheit.

It is an object of the present invention to provide an improved highly efficient water distillation process and apparatus for use with a heat pump system wherein high pressure requirements are minimized and special seals are not required to facilitate system operation and which facilitates a very sanitary construction.

It is an object of the present invention to provide an improved highly efficient water distillation process and apparatus for use with a heat pump system wherein initial capital outlay is minimized.

It is an object of the present invention to provide an improved highly efficient water distillation process and apparatus for use with a heat pump system wherein maintenance requirements and costs are minimized.

It is an object of the present invention to provide an improved highly efficient water distillation process and apparatus for use with a heat pump system wherein a great variety of different types and classes of refrigerants are usable.

It is an object of the present invention to provide an improved highly efficient water distillation process and apparatus for use with a heat pump system wherein the latent heat of the purified water is recovered by evaporation of refrigerant in the adjacently positioned heat pump system.

It is an object of the present invention to provide an improved highly efficient water distillation process and apparatus for use with a heat pump system wherein energy is added to the system during the compression of the refrigerant vapors.

It is an object of the present invention to provide an improved highly efficient water distillation process and apparatus for use with a heat pump system wherein contamination of the distillate is minimized.

It is an object of the present invention to provide an improved highly efficient water distillation process and apparatus for use with a heat pump system wherein a depyrogenating baffle removes contaminants and minute distillate particles from the pure water vapor.

It is an object of the present invention to provide an improved highly efficient water distillation process and apparatus for use with a heat pump system wherein contaminants are removed from the water evaporator by continuous blow down purge with heat reclaiming thereof.

It is an object of the present invention to provide an improved highly efficient water distillation process and apparatus for use with a heat pump system wherein water vaporization is achieved at approximately 220 degrees Fahrenheit to facilitate disinfection thereof.

It is an object of the present invention to provide an improved highly efficient water distillation process and apparatus for use with a heat pump system wherein the heat pump system includes a thermal-expansion valve which can reduce refrigerant pressure to approximately 65 psi corresponding to a saturation temperature of 180 degrees Fahrenheit.

It is an object of the present invention to provide an improved highly efficient water distillation process and apparatus for use with a heat pump system wherein the heat pump system includes a compressor for achieving a nominal 125 psi with the corresponding saturation temperature of 225 degrees Fahrenheit.

It is an object of the present invention to provide an improved highly efficient water distillation process and apparatus for use with a heat pump system wherein vaporization of water is achieved by boiling rather than a flash distillation process at reduced pressure.

It is an object of the present invention to provide an improved highly efficient water distillation process and apparatus for use with a heat pump system wherein condensing of the water is achieved at approximately 180 degrees Fahrenheit.

BRIEF DESCRIPTION OF THE DRAWING

While the invention is particularly pointed out and distinctly claimed in the concluding portions herein, a preferred embodiment is set forth in the following detailed description which may be best understood when read in connection with the accompanying drawing, in which the FIGURE illustrates a schematic representation of an embodiment of a high efficiency water distillation process and apparatus using a heat pump system of the present invention.

DETAILED DESCRIPTION OF THE PREFERRED EMBODIMENT

The present invention provides a high efficiency water distillation apparatus and process for use thereof using a heat pumping apparatus 10 which includes refrigerant 12 circulating through refrigerant conduit means 14. Liquid refrigerant is accumulated within the liquid receiver means 16. The liquid refrigerant 12 within conduit 14 may then be carried through a sight glass 28 to facilitate inspection thereof and through a filter dryer 30. An expansion valve 18 is subsequently positioned within the refrigerant conduit 14 to reduce the pressure thereof. Refrigerant 12 is then vaporized in the refrigerant evaporator means 20. This vaporized refrigerant is then compressed by way of compressor means 22.

A pressure regulator 24 may be positioned within the refrigerant conduit 14 between the refrigerant evaporator means 20 and the compressor means 22. Evaporator pressure regulator 24 will control the pressure within the refrigerant evaporator 20 to facilitate refrigerant vaporization at a predetermined temperature.

The compressed refrigerant vapor 12 will pass from the compressor means 22 to the refrigerant condensing means 26 wherein it will be condensed and cooled to give up the latent heat to facilitate boiling of the feed water. The heat pumping apparatus 10 can include an oil separator means 32 positioned adjacent the compressor means 22.

The water distillation means 34 of the present invention includes a feed water supply line means 36 which may include an inlet end 38 for admitting feed water therein at a temperature of approximately 70 degrees Fahrenheit. The feed water will pass through a water pre-heating means 40 which is designed to elevate the water temperature to a level between 100 and 200 degrees Fahrenheit preferably in the area of 150 degrees Fahrenheit.

The pre-warmed feed water will then pass into a water evaporator means 42 positioned in thermal communication with respect to the refrigerant condensing means 26. At a pressure of approximately one atmosphere the water will be boiled and the temperature of the water vapor exiting will be increased to approximately 220 degrees Fahrenheit.

A primary contaminant removal means 44 such as a blow down removal means 46 will be operatively connected with respect to the water evaporator means 42 to remove contaminants therefrom. A secondary contaminant removal means 48 such as a baffle means 50 will be adapted to remove particles and condensate droplets from the distilled vapor after it has exited the water evaporator means 42. The pure water vapor now at 220 degrees Fahrenheit will pass directly to the water condensing means 54 positioned immediately adjacent the refrigerant evaporator means 20 such that the latent heat of the distillate can be reclaimed by water condensation within water condensing means 54 simultaneously with refrigerant vaporization within the refrigerant evaporating means 20. The condensed high quality pure water have a temperature thereof of approximately 180 degrees Fahrenheit will then exit through the water exit line 56.

It is desirable to reclaim the heat of contaminants removed from the water distillation means 34. For this purpose a heat reclaiming means 52 will be positioned within the feed water supply line means 36 upstream from the water pre-heating means 40. Heat reclaiming means 52 will be in thermal communication with respect to both the primary contaminant removal means 44 and the secondary contaminant removal means 48 in order to remove the heat thereof to facilitate economizing of operation of the water pre-heating means 40.

The simultaneous operation of the heat pumping apparatus 10 and the water distillation means 34 is best shown by viewing the figure of the present invention. The main water supply line 36 is shown in darker outline to facilitate analysis of the figure. As shown in that drawing, feed water is brought in through the feed water supply line means 36 and passes through the heat reclaiming means 52 wherein heat from the system blow down is recovered. The blow down is needed to prevent impurities from becoming too highly concentrated. The blow down removal means 46 is a continuous removal of contaminants from the water evaporator means 42.

The feed water then passes through the water pre-heating means 40 where its sensible heat and temperature are increased. The feed water is boiled in the water evaporator means 42 where the heat source is the refrigerant condensing within the coils of the refrigerant condensing means 26. This condensation occurs at a temperature above 212 degrees Fahrenheit. The distillate vapor is then passed through a baffle means 50 that utilizes flow kinetics to separate particles such a pyrogens and/or minute droplets of condensate from the water vapor. This pure water vapor is then condensed at approximately 180 degrees Fahrenheit in the water condensing means 54 where its latent heat is transferred to the evaporating refrigerant 12 of refrigerant evaporator means 20.

The elevated condensing temperature is desirable in order to insure maintenance of disinfection. Furthermore this elevated temperature constrains the entire thermodynamic cycle to run at higher temperatures and corresponding pressures above atmosphere.

Within the heat pumping apparatus 10 the expansion valve means 18 is preferably adapted to reduce the pressure of the refrigerant 12 to approximately 65 psi which for trichloromonofluoromethane corresponds to a saturation temperature of 180 degrees Fahrenheit. Subsequent thereto the refrigerant is vaporized in the refrigerant evaporator means 20 which is positioned adjacent the water condensing means 54 to be in thermodynamic communication therewith. In this manner the latent heat of the distillate will be absorbed and reclaimed. The refrigerant will then pass through an evaporator pressure regulator 24 which will be adjusted to maintain the pressure within the refrigerant evaporator means 20 as desired.

The refrigerant vapor is then compressed by compressor means 22 to a nominal 125 psi with a corresponding saturation temperature of 220 degrees Fahrenheit. The super-heated vapor may then passed through an oil separator 32 and returned to the refrigerant condensing means 26 positioned adjacent the water evaporator means 42 where it is cooled and condensed again giving up its latent heat to boil the water within the water evaporator means 42.

As such the total heat available for heating and boiling includes latent heat of condensation and the heat of compression of the refrigerant gas. For most applications this total heat will not be quite sufficient to permit operation at the desired temperature and must be supplemented by the water pre-heating means 40.

While particular embodiments of this invention have been shown in the drawings and described above, it will be apparent, that many changes may be made in the form, arrangement and positioning of the various elements of the apparatus and process. In consideration thereof it should be understood that preferred embodiments of this invention disclosed herein are intended to be illustrative only and not intended to limit the scope of the invention.

I claim:

1. A water distillation apparatus using a heat pump system with refrigerant comprising:
   a) heat pumping apparatus including:
      (1) a refrigerant conduit means for carrying refrigerant therein;
      (2) a liquid receiver means for accumulating refrigerant therein in liquid phase;
      (3) an expansion valve means operatively connected to said refrigerant conduit means for expanding refrigerant received from said liquid receiver means;
      (4) a refrigerant evaporator means operatively connected to said refrigerant conduit means for receiving refrigerant from said expansion valve means for vaporizing thereof;
      (5) a compressor means operatively connected to said refrigerant conduit means for compressing refrigerant vapor received from said refrigerant evaporator means;
      (6) a refrigerant condensing means for receiving compressed refrigerant vapor from said compressor means for condensing thereof into liquid phase for accumulation within said liquid receiver means; and
   b) a water distillation means including:
      (1) a feed water supply means defining an inlet end thereof to provide a supply of feed water;
      (2) a water evaporator means for receiving water through said feed water supply line means, said water evaporator means being operatively positioned in thermal communication with said refrigerant condensing means for receiving heat therefrom for vaporization of the feed water passing through said water evaporator means, said water evaporator means heating the feed water to the saturation temperature thereof for achieving vaporization thereof by boiling;
      (3) a water pre-heating means positioned within the feed water for pre-heating thereof prior to exit of feed water from said water evaporator means for facilitating heating of the feed water to saturation temperature thereof to achieve vaporization thereof by boiling;
      (4) a water condenser means for receiving the vaporized water from said water evaporator means, said water condenser means being operatively positioned in thermal communication with said refrigerant evaporator means for cooling therefrom to facilitate condensation of vaporized feed water within said water condenser means;
      (5) a primary blow down contaminant removal means operatively connected to said water evaporator means for receiving contaminants and impurities accumulated therein from feed water supplied to said water evaporator means;
      (6) a secondary contaminant removal means for receiving the vaporized feed water from said water evaporator means for removal of contaminants therefrom, said secondary contaminant removal means supplying purified water vapor to said water condensing means; and (7) a water exit line in fluid flow communication with said water condenser means for conveying distilled water therefrom.

2. A water distillation apparatus using a heat pump system as defined in claim 1 further comprising a heat reclaiming means positioned within said feed water supply line means between said inlet end and said water pre-heating means, said heat reclaiming means being in thermal communication with said primary blow down contaminant removal means for receiving heat from materials removed by said primary blow down contaminant removal means for heating of feed water passing through said heat reclaiming means prior to entry thereof in said water pre-heating means.

3. A water distillation apparatus using a heat pump system as defined in claim 1 wherein said secondary contaminant removal means comprises a baffle means for removing particulate contaminants and liquid water droplets from vaporized water passing therethrough.

4. A water distillation apparatus using a heat pump system as defined in claim 1 further comprising a heat reclaiming means positioned within said feed water supply line means between said inlet end and said water pre-heating means, said heat reclaiming means being in thermal communication with said secondary contaminant removal means for receiving heat from materials removed by said secondary contaminant removal means for heating of feed water passing through said heat reclaiming means prior to entry thereof in said water pre-heating means.

5. A water distillation apparatus using a heat pump system as defined in claim 1 wherein said secondary contaminant removal means comprises a baffle means providing a plurality of surfaces over which the water vapor is passed to remove particulate contaminants and water droplets therefrom.

6. A water distillation apparatus using a heat pump system as defined in claim 1 wherein said heat pumping apparatus includes a sight glass means positioned within said refrigerant conduit means between said liquid receiver means and said expansion valve means.

7. A water distillation apparatus using a heat pump system as defined in claim 1 wherein said heat pumping apparatus includes a filter-dryer means positioned within said refrigerant conduit means between said liquid receiver means and said expansion valve means.

8. A water distillation apparatus using a heat pump system as defined in claim 1 wherein said heat pumping apparatus includes an evaporator pressure regulator positioned within said refrigerant conduit means between said refrigerant evaporating means and said compressor means for restricting the evaporation of refrigerant to occur at approximately 180 degrees Fahrenheit.

9. A water distillation apparatus using a heat pump system as defined in claim 1 wherein said heat pumping apparatus further includes an oil separator means positioned within said refrigerant conduit means between said compressor means and said refrigerant condensing means.

10. A water distillation apparatus using a heat pump system with refrigerant comprising:

a) heat pumping apparatus comprising:
(1) refrigerant conduit means for carrying refrigerant therein;

(2) a liquid receiver means for accumulating refrigerant therein in liquid phase;

(3 an expansion valve means operatively connected to said refrigerant conduit means for expanding refrigerant received from said liquid receiver means;

(4) a refrigerant evaporator means operatively connected to said refrigerant conduit means for receiving refrigerant from said expansion valve means;

(5) a compressor means operatively connected to said refrigerant conduit means for compressing refrigerant vapor received from said refrigerant evaporator means;

(6) an evaporator pressure regulator positioned within said refrigerant conduit means between said refrigerant evaporating means and said compressor means for restricting the evaporation of refrigerant to occur at approximately 180 degrees Fahrenheit;

(7) a refrigerant condensing means for receiving compressed refrigerant vapor from said compressor means for condensing thereof into liquid phase at approximately 225 degrees Fahrenheit for accumulation within said liquid receiver means;

a visual indication means positioned within said refrigerant conduit means between said liquid receiver means and said expansion valve means;

(9) a filter-dryer means positioned within said refrigerant conduit means between said liquid receiver means and said expansion valve means;

(10) an oil separator means positioned within said refrigerant conduit means between said compressor means and said refrigerant condensing means;

b) a water distillation means comprising: p2 (1) a feed water supply line means defining an inlet end thereof for providing a supply of feed water;

(2) a water evaporator means for receiving water through said feed water supply line means, said water evaporator means being operative at a level of at least one atmosphere of barometric pressure, said water evaporator means being operatively positioned in thermal communication with said refrigerant condensing means for receiving heat therefrom for vaporization of the feed water passing through said water evaporator means, said water evaporator means heating the feed water to the saturation temperature at a pressure at least as great as atmospheric pressure for achieving vaporization thereof by boiling;

(3) a water pre-heating means positioned within the feed water for heating thereof to approximately 150 degree Fahrenheit prior to entry of feed water into said water evaporator means for facilitating heating of the feed water to saturation temperature at a pressure at least as great as atmospheric pressure to achieve vaporization thereof by boiling;

(4) a primary contaminant removal means operatively connected to said water evaporator means for receiving contaminants and impurities accumulated therein from feed water supplied to said water evaporator means, said primary contaminant removal means comprising a blow down removal means for receiving contaminants and impurities from water within said water evaporator means;

(5) a secondary contaminant removal means for receiving the vaporized feed water from said water evaporator means for removal of contaminants therefrom, said secondary contaminant removal means comprising a baffle means providing a plurality of surfaces over which the water vapor therein passes to remove particulate contaminants and water droplets therefrom;

(6) a heat reclaiming means positioned within said feed water supply line means between said inlet end thereof and said water pre-heating means, said heat reclaiming means being in thermal communication with said primary and said secondary contaminant removal means for receiving heat from materials removed by said primary and said secondary contaminant removal means for heating of feed water passing through said heat reclaiming means prior to entry thereof in said water pre-heating means;

(7) a water condenser means for receiving the vaporized water from said secondary contaminant removal means, said water condenser means being operatively positioned in thermal communication with said refrigerant evaporator means to be cooled therefrom to facilitate condensation of vaporized feed water within said water condenser means at approximately 180 degrees Fahrenheit; and (8) a water exit line in fluid flow communication with said water condenser means for conveying distilled water therefrom.

11. A water distillation process using a heat pump system comprising:
a) accumulating of liquid refrigerant within a receiver;
b) expanding of liquid refrigerant from the receiver after accumulation therein;
c) vaporizing of the expanded refrigerant within a refrigerant evaporator;
d) compressing of the vaporized refrigerant by a compressor;
e) condensing of the compressed refrigerant vapor within a refrigerant condenser;
f) returning of the condensed liquid refrigerant for accumulation within the receiver;
g) providing a supply of feed water to a pre-heating means;
h) pre-heating of the feed water to an elevated temperature;
i) positioning to water evaporator in thermal communication with the refrigerant condenser to receiver heat therefrom;
j) conveying of the pre-heating feed water within a water evaporator;
k) heating of the feed water within the water evaporator to the saturation temperature thereof for vaporizing thereby by boiling, said heating of the feed water being facilitated by heat received from the refrigerant condenser;
l) blow down removing of primary contaminants and impurities from feed water located within the water evaporator to facilitate purification thereof;
m) conveying of the boiled water vapor from the water evaporator to a water condenser;
n) positioning the water condenser in thermal communication with the refrigerant evaporator to facilitate heat flow therebetween;
o) condensing of the vaporized and purified water within a water condenser facilitated by cooling of the water condenser by the refrigerant evaporator;
p) conveying of the condensed purified distilled water from the water condenser; and
q) removing of secondary contaminants and impurities from the boiled water vapor being conveyed from the water evaporator to the water condenser.

12. A water distillation process using a heat pump system as defined in claim 11 wherein transferring of heat from the refrigerant condenser to the water evaporator provides all the heat necessary to boil the preheated feed water supplied to the water evaporator.

13. A water distillation process using a heat pump system as defined in claim 11 wherein the transferring of heat from the water condenser to the refrigerant evaporator provides sufficient cooling of the water condenser for condensing of the boiled water vapor supplied thereto.

14. A water distillation process using a heat pump system as defined in claim 11 further including reclaiming of heat from the removed primary contaminants and impurities by transfer of the heat thereof into the feed water prior to heating thereof within the water evaporator.

15. A water distillation process using a heat pump system as defined in claim 11 wherein said removing of secondary contaminants and impurities comprises passing of the water vapor across a plurality of baffle means for removing particulate contaminants and liquid water droplets therefrom.

16. A water distillation process using a heat pump system as defined in claim 11 further including reclaiming of heat from the removed secondary contaminants and impurities by transfer of the heat thereof into the feed water prior to heating thereof within the water evaporator.

17. A water distillation process using a heat pump system as defined in claim 11 wherein said pre-heating elevates the feed water temperature to approximately 150 degrees Fahrenheit.

18. A water distillation process using a heat pump system as defined in claim 11 wherein said condensing of compressed refrigerant vapor within the refrigerant condenser is performed at approximately 225 degrees Fahrenheit.

19. A water distillation process using a heat pump system as defined in claim 11 further comprising disinfecting of the water exiting from the water condenser by condensing of the vaporized and purified water vapor with the water condenser at approximately 180 degrees Fahrenheit.

20. A water distillation process using a heat pump system as defined in claim 11 further comprising filtering and drying of the liquid refrigerant while passing from the receiver to the expansion valve.

21. A water distillation process using a heat pump system as defined in claim 11 wherein heating of the feed water within the water evaporator to the saturation temperature is facilitated by heat provided by the latent heat of condensing of the refrigerant within the refrigerant condenser and by the heat of compression of the refrigerant.

22. A water distillation process using a heat pump system as defined in claim 11 wherein said heating of the feed water within the water evaporator to the saturation temperature thereof for vaporizing thereof by boiling is performed at a barometric pressure of at least one atmosphere.

23. A water distillation process using a heat pump system as defined in claim 11 further comprising regulating of the evaporator pressure of the refrigerant vapor between said refrigerant vaporizing and said refrigerant compressing to restrict said vaporizing of refrigerant to occur at approximately 180 degrees Fahrenheit.

24. A water distillation process using a heat pump system comprising:
   a) accumulating of liquid refrigerant within a receiver;
   b) filtering and drying of liquid refrigerant after exiting from the receiver;
   c) expanding of liquid refrigerant from the receiver at an expansion valve;
   d) vaporizing of the expanded refrigerant within a refrigerant evaporator;
   e) compressing of the vaporized refrigerant by a compressor;
   f) regulating of the evaporator pressure of the refrigerant vapor between said refrigerant vaporizing and said refrigerant compressing to restrict said vaporizing of refrigerant to occur at approximately 180 degrees Fahrenheit;
   g) condensing of the compressed refrigerant vapor within a refrigerant condenser at approximately 225 degrees Fahrenheit;
   h) returning of the condensed liquid refrigerant for accumulation within the receiver;
   i) providing a supply of feed water to a pre-heating means;
   j) pre-heating of the feed water to a temperature of approximately 150 degrees Fahrenheit;
   k) positioning a water evaporator in thermal communication with the refrigerant condenser to receiver heat therefrom;
   l) conveying of the pre-heated feed water to a water evaporator;
   m) heating of the feed water within the water evaporator to the saturation temperature thereof at approximately one atmosphere of barometric pressure for vaporizing thereof by boiling, said heating of the feed water being provided by the latent heat of condensing of the refrigerant within the refrigerant condenser and by the heat of compression of the refrigerant therein as received by the water evaporator from the refrigerant condenser;
   n) removing by blow down of primary contaminants and impurities from feed water located within the water evaporator to facilitate purification thereof;
   o) reclaiming of heat from the contaminants and impurities removed from the water within the water evaporator by transferring the heat thereof to the feed water prior to heating thereof within the water evaporator;
   p) conveying of the boiled water vapor from the water evaporator to a water condenser;
   q) removing of secondary contaminants and impurities from the boiled water vapor being conveyed from the water evaporator to the water condenser by passing the water across a plurality of baffles for removing particulate contaminants and liquid water droplets therefrom;
   r) reclaiming of the heat from the removed secondary contaminants and impurities by transfer of the heat thereof into the feed water prior to heating thereof within the water evaporator;
   s) positioning the water condenser in thermal communication with the refrigerant evaporator to facilitate heat flow therebetween;
   t) condensing and disinfecting of the vaporized and purified water at a temperature of approximately 180 degrees Fahrenheit within a water condenser facilitated by cooling of the water condenser by the refrigerant evaporator; and
   u) conveying of the condensed purified distilled water from the water condenser.

* * * * *